| (12) | United States Patent | (10) Patent No.: | US 7,604,161 B2 |
|---|---|---|---|
| | Tamune | (45) Date of Patent: | Oct. 20, 2009 |

(54) QUESTION PAPER FORMING APPARATUS AND QUESTION PAPER FORMING METHOD

(75) Inventor: Michihiro Tamune, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 277 days.

(21) Appl. No.: 11/333,241

(22) Filed: Jan. 18, 2006

(65) Prior Publication Data

US 2006/0289625 A1 Dec. 28, 2006

(30) Foreign Application Priority Data

Jun. 24, 2005 (JP) ............................. 2005-184527

(51) Int. Cl.
*G06F 17/00* (2006.01)
*G09B 3/00* (2006.01)

(52) U.S. Cl. .................... 235/375; 434/172; 434/322; 283/72; 715/221; 382/176

(58) Field of Classification Search ................ 235/375; 434/353, 362, 322, 348, 349, 354; 705/506; 283/72, 67, 5, 44–46; 412/1; 382/173–180; 715/221

See application file for complete search history.

(56) References Cited

U.S. PATENT DOCUMENTS

| 5,339,169 | A | * | 8/1994 | Meguro et al. ............... 358/403 |
| 5,366,377 | A | * | 11/1994 | Miller ........................ 434/178 |
| 5,775,918 | A | * | 7/1998 | Yanagida et al. ............. 434/353 |
| 5,907,835 | A | * | 5/1999 | Yokomizo et al. ............... 707/1 |
| 6,065,972 | A | * | 5/2000 | Doan .......................... 434/327 |
| 2002/0105673 | A1 | * | 8/2002 | Kurashina ................... 358/1.15 |
| 2004/0190772 | A1 | * | 9/2004 | Constantin et al. ........... 382/175 |
| 2005/0037324 | A1 | * | 2/2005 | Sumimoto ................... 434/322 |
| 2006/0088812 | A1 | * | 4/2006 | Slijp et al. ................... 434/362 |
| 2007/0072164 | A1 | * | 3/2007 | Katsuyama et al. .......... 434/353 |

FOREIGN PATENT DOCUMENTS

JP A 2001-331089 11/2001

* cited by examiner

*Primary Examiner*—Seung H Lee
*Assistant Examiner*—Christle I Marshall
(74) *Attorney, Agent, or Firm*—Oliff & Berridge, PLC (57) ABSTRACT

A question paper forming apparatus, includes: an image reading unit that reads an image of a question original in which a character string for constituting an answer of a question is designated by marking; an answer list forming unit that extracts the character string from the image data of the question original to form an electronic data of an answer list; a question sentence forming unit that deletes the character string from the image data of the question original and that sets an answer column to a portion where the character string is deleted, so as to form an electronic data of a question sentence; and a printing unit that prints out an answer document which contains the electronic data of the answer list and the electronic data of the question sentence as a question paper on separate papers respectively.

4 Claims, 7 Drawing Sheets

WHEN PRODUCTION AMOUNTS OF VEGETABLES AND FRUITS IN JAPAN ARE COMPARED WITH EACH OTHER ON THE BASE OF THE ADMINISTRATIVE DIVISIONS OF JAPAN,

·· THE PREFECTURE WHOSE RICE PRODUCTION AMOUNT IS THE LARGEST AMOUNT CORRESPONDS TO HOKKAIDO.

·· THE PREFECTURE WHOSE MANDARIN ORANGE PRODUCTION AMOUNT IS THE LARGEST AMOUNT CORRESPONDS TO AICHI PREFECTURE.

·· THE PREFECTURE WHOSE APPLE PRODUCTION AMOUNT IS THE LARGEST AMOUNT CORRESPONDS TO AOMORI PREFECTURE.

·· THE PREFECTURE WHOSE POTATO PRODUCTION AMOUNT IS THE LARGEST AMOUNT CORRESPONDS TO HOKKAIDO.

·· THE PREFECTURE WHOSE SWEET POTATO PRODUCTION AMOUNT IS THE LARGEST AMOUNT CORRESPONDS TO KAGOSHIMA PREFECTURE.

·· THE PREFECTURE WHOSE CABBAGE PRODUCTION AMOUNT IS THE LARGEST AMOUNT CORRESPONDS TO AICHI PREFECTURE.

| NUMBER | ANSWER (CHARACTER STRING) |
|---|---|
| 1 | HOKKAIDO |
| 2 | MANDARIN ORANGE |
| 3 | AOMORI PREFECTURE |
| 4 | HOKKAIDO |
| 5 | KAGOSHIMA PREFECTURE |
| 6 | AICHI PREFECTURE |

FIG. 6

WHEN PRODUCTION AMOUNTS OF VEGETABLES AND FRUITS IN JAPAN ARE COMPARED WITH EACH OTHER ON THE BASE OF THE ADMINISTRATIVE DIVISIONS OF JAPAN, ·······················

························································

·· THE PREFECTURE WHOSE RICE PRODUCTION AMOUNT IS THE LARGEST AMOUNT CORRESPONDS TO [1)______]. ············

·· THE PREFECTURE WHOSE [2)__________] PRODUCTION AMOUNT IS THE LARGEST AMOUNT CORRESPONDS TO AICHI PREFECTURE.

························································

·· THE PREFECTURE WHOSE APPLE PRODUCTION AMOUNT IS THE LARGEST AMOUNT CORRESPONDS TO [3)______].

·· THE PREFECTURE WHOSE POTATO PRODUCTION AMOUNT IS THE LARGEST AMOUNT CORRESPONDS TO [4)______]. ········

·· THE PREFECTURE WHOSE SWEET POTATO PRODUCTION AMOUNT IS THE LARGEST AMOUNT CORRESPONDS TO [5)______].

·· THE PREFECTURE WHOSE CABBAGE PRODUCTION AMOUNT IS THE LARGEST AMOUNT CORRESPONDS TO [6)____]. ···········

FIG. 7

WHEN PRODUCTION AMOUNTS OF VEGETABLES AND FRUITS IN JAPAN ARE COMPARED WITH EACH OTHER ON THE BASE OF THE ADMINISTRATIVE DIVISIONS OF JAPAN, ······················

··························································

·· THE PREFECTURE WHOSE RICE PRODUCTION AMOUNT IS THE LARGEST AMOUNT CORRESPONDS TO HOKKAIDO. ·············

·· THE PREFECTURE WHOSE MANDARIN ORANGE PRODUCTION AMOUNT IS THE LARGEST AMOUNT CORRESPONDS TO AICHI PREFECTURE. ································································

·· THE PREFECTURE WHOSE APPLE PRODUCTION AMOUNT IS THE LARGEST AMOUNT CORRESPONDS TO AOMORI PREFECTURE.

·· THE PREFECTURE WHOSE POTATO PRODUCTION AMOUNT IS THE LARGEST AMOUNT CORRESPONDS TO HOKKAIDO. ·········

·· THE PREFECTURE WHOSE SWEET POTATO PRODUCTION AMOUNT IS THE LARGEST AMOUNT CORRESPONDS TO KAGOSHIMA PREFECTURE. ···································

·· THE PREFECTURE WHOSE CABBAGE PRODUCTION AMOUNT IS THE LARGEST AMOUNT CORRESPONDS TO AICHI PREFECTURE.

QUESTION PAPER FORMING APPARATUS AND QUESTION PAPER FORMING METHOD

BACKGROUND OF THE INVENTION

1. Field of the Invention

The present invention is related to a question paper forming apparatus and a question paper forming method, which are suitably applied to such a case that a question paper is formed by using materials held by a user.

2. Description of the Related Art

In connection with current progress in information communications which are typically known as the Internet, correspondence education systems using computers have been largely carried out. As to these correspondence education systems, for instance, the below-mentioned patent publication 1 has proposed such a correspondence education system equipped with a grading means for grading an answer with respect to an examination question, and an information processing means for variably setting a degree of difficulty as to an examination question which will be transmitted next time in response to a graded result obtained by the grading means in order to distribute such a text made by considering a learning level of a learning person and a progress condition of the learning person.

On the other hand, in one-to-one type coaching schools where teachers are faced to pupils in an one-to-one corresponding relationship, and also in educational fields, the following opportunities may occur. That is, the teachers form question papers which may be properly fitted to learning capability and learning targets of individual pupils irrespective of workbooks and collections of questions, which are published by teaching material publishers, and the like. Then, the teachers pass the question papers to the pupils in order to answer these questions. In particular, such a question is called as a "treating question", while this question causes a pupil to repeatedly answer the question of a learning field, or a learning section, in which the pupil is very weak. Such an action that the above-explained "treating question" is described in a question paper and the pupil answers this "treating question" may constitute an effective means in order to improve the learning capability of the pupil.

Conventionally, a sequential operation for forming the above-described question paper is roughly carried out as follows: That is, first of all, if such a material is found out in which a sentence suitable for forming a question has been described, then the relevant portion and/or the relevant page of this material are copied on a paper, so that an original (will be referred to as "question original" hereinafter) which constitutes abase of a question paper is obtained. Next, after character strings which are wanted to be employed as answers of questions are searched in the acquired question original and are stored in another paper in order to judge as to whether answers are correct, or not after a test is accomplished, these character strings are deleted from the question original by using a write-out fluid, a revising pen, a revising tape, or the like. Next, numbers are applied to portions from which the character strings have been deleted, and an answer column is provided. Next, the question original where the answer column has been provided is copied to a paper, so that a question paper may be obtained.

SUMMARY OF THE INVENTION

The present invention provides an question paper forming apparatus and method in which a question paper can be formed in a simple manner and within a short time, while excessively heavy workloads are not given to a question forming person.

The invention may provide a question paper forming apparatus, including: an image reading unit that reads an image of a question original in which a character string for constituting an answer of a question is designated by marking; an answer list forming unit that extracts the character string designated by the marking from the image data of the question original and that forms an electronic data of an answer list by the use of the extracted character string; a question sentence forming unit that deletes the character string designated by the marking from the image data of the question original and that sets an answer column to a portion where the character string is deleted, so as to form an electronic data of a question sentence; and a printing unit that prints out an answer document which contains the electronic data of the answer list and the electronic data of the question sentence as a question paper on separate papers respectively.

The invention may provide a question paper forming method, including: reading an image of a question original in which a character string for constituting an answer of a question is designated by marking; extracting the character string designated by the marking from the image data of the question original; forming electronic data of an answer list by the use of the extracted character string; deleting the character string designated by the marking from the image data of the question original; setting an answer column to a portion where the character string is deleted to form electronic data of a question sentence; and printing out an answer document which contains the electronic data of the answer list and the electronic data of the question sentence as a question paper on separate papers respectively.

BRIEF DESCRIPTION OF THE DRAWINGS

Embodiment may be described in detail with reference to the accompanying drawings, in which.

DETAILED DESCRIPTION OF THE INVENTION

Referring now to drawings, specific embodiments will be described in detail.

Figure 1:
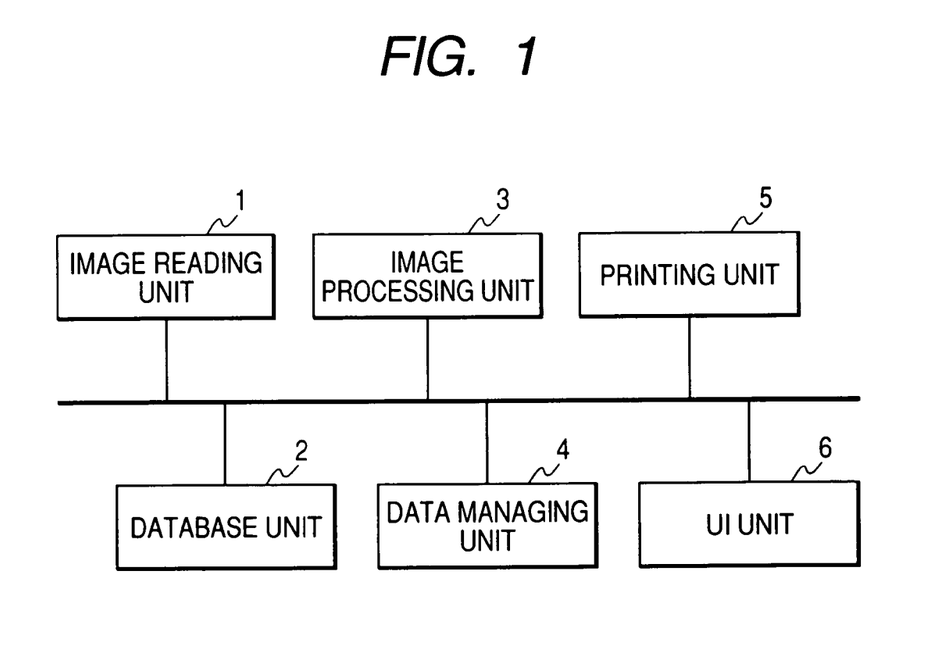
FIG. 1 is a block diagram for showing an arrangement of a question paper forming apparatus according to an embodiment mode of the present invention.

FIG. 1 is a block diagram for indicating an arrangement of a question paper forming apparatus according to an embodiment mode of the present invention. The question paper forming apparatus shown in the drawing has been mainly arranged by providing an image reading unit 1, a database unit 2, an image processing unit 3, a data managing unit 4, a printing unit 5, and a user interface unit (will be referred to as a "UI unit" hereinafter) 6. These function units have been connected to a common bus.

The image reading unit 1 reads an image of a question original which is used so as to form a question paper. The image reading unit 1 is arranged by employing a scanner apparatus for optically reading an image of a question original, so that image data (scan data) of this optically read question original is produced.

Figure 2:
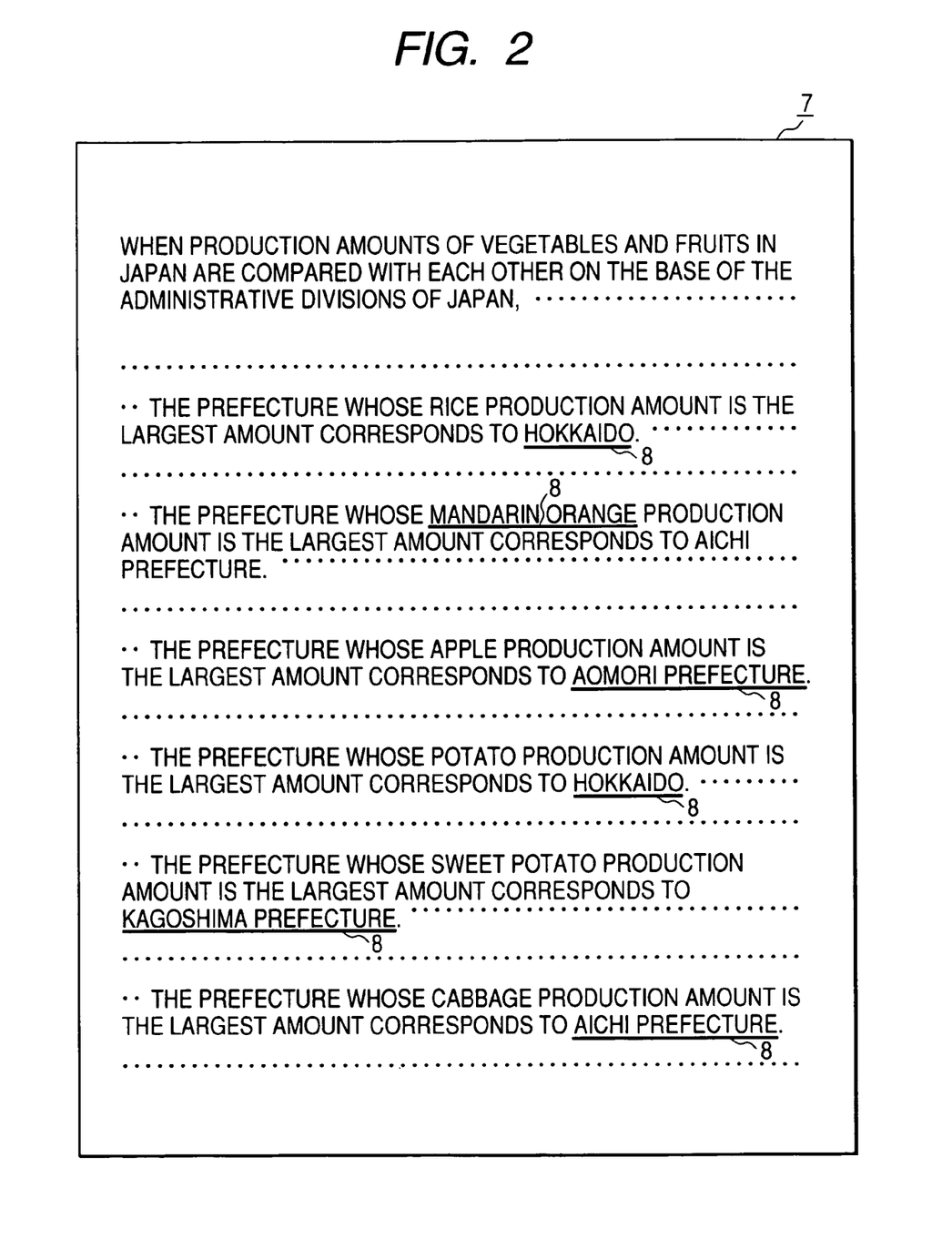
FIG. 2 is a diagram for indicating an example of a question original.

FIG. 2 is a diagram for indicating an example of a question original 7. The question original 7 shown in this drawing contains sentences (sentences which constitute base of question sentence) in which character stings for constituting answers of questions are designated by marking 8. The question original 7 is obtained by that a forming person (teacher etc.) who tries to form a question paper finds out materials (for example, reference book, teaching material, literature, magazine, newspaper etc.) in which sentences suitable for a so-called "blank-filling question" have been written. As to the question original 7, for instance, in such a case that while a material for constituting the base of this question original 7 belongs to possession of a question forming person, there is no problem even if the marking 8 is written on this original plane, this material may be used as the question original 7. Also, when there is a problem that the marking 8 is written, either a relevant page or a relevant plane of the material where the above-explained character strings have been described is copied to produce an output paper, and then, this output paper may be alternatively used as the question original 7.

The marking 8 corresponds to such a marking which is previously written into the sentences contained in the question original 7 by the question forming person in order to individually designate character strings which are wanted to be used as answers of blank-filling questions when a question paper is formed. In an example shown in this drawing, these character strings are "Hokkaido", "mandarin orange", "Aomori prefecture", "Hokkaido", "Kagoshima prefecture", and "Aichi prefecture." The marking 8 is written by employing a pen using predetermined color ink which has been previously set, more preferably by employing a pen (fluorescent pen) using semi-transparent fluorescent ink, a line marker, and the like. As to colors of fluorescent ink, various sorts of colors are provided, e.g., yellow, light blue, pink, orange, yellowish green, blue, red, green, etc. Although no limitation is basically made in usable colors, it is required that colors which are used to write the marking 8 have been preset in the question paper forming apparatus.

Also, in order to improve a simplification of processing operation, it is desirable to previously unify (rule) designating systems of character strings for writing the marking 8. In this embodiment mode, as one example, such a system for designating a character string by the marking 8 of an underline has been employed. It should be noted that in addition to this underline marking system, for instance, a system for designating a character string by way of marking painted over with fluorescent ink may be alternatively employed, or another system for designating a character string by marking made of a rectangular surrounding line may be alternatively employed. Also, it is possible to employ a structure capable of exclusively setting a system for designating a character string by the marking 8 among these plural designating systems in response to a favorite of a question forming person. In the case that a newspaper, a magazine, and the like are employed as a question original, since there are many possibilities that items which are not used as questions are contained around the question original, either an area to be used or an unnecessary area may be designated to be extracted, or excluded by employing such a rule which is different from a designating system of a character string which constitutes a question, for example, surrounding of an area by using a specific color.

The database unit 2 is employed so as to hold and store thereinto various sorts of data. The database unit 2 is constituted by employing, for example, a large capacity storage apparatus such as a hard disk drive. In addition to the function capable of storing thereinto data, the database unit 2 is equipped with a function capable of processing (reading, updating, deleting, retrieving, and the like) the stored data.

Figure 3:
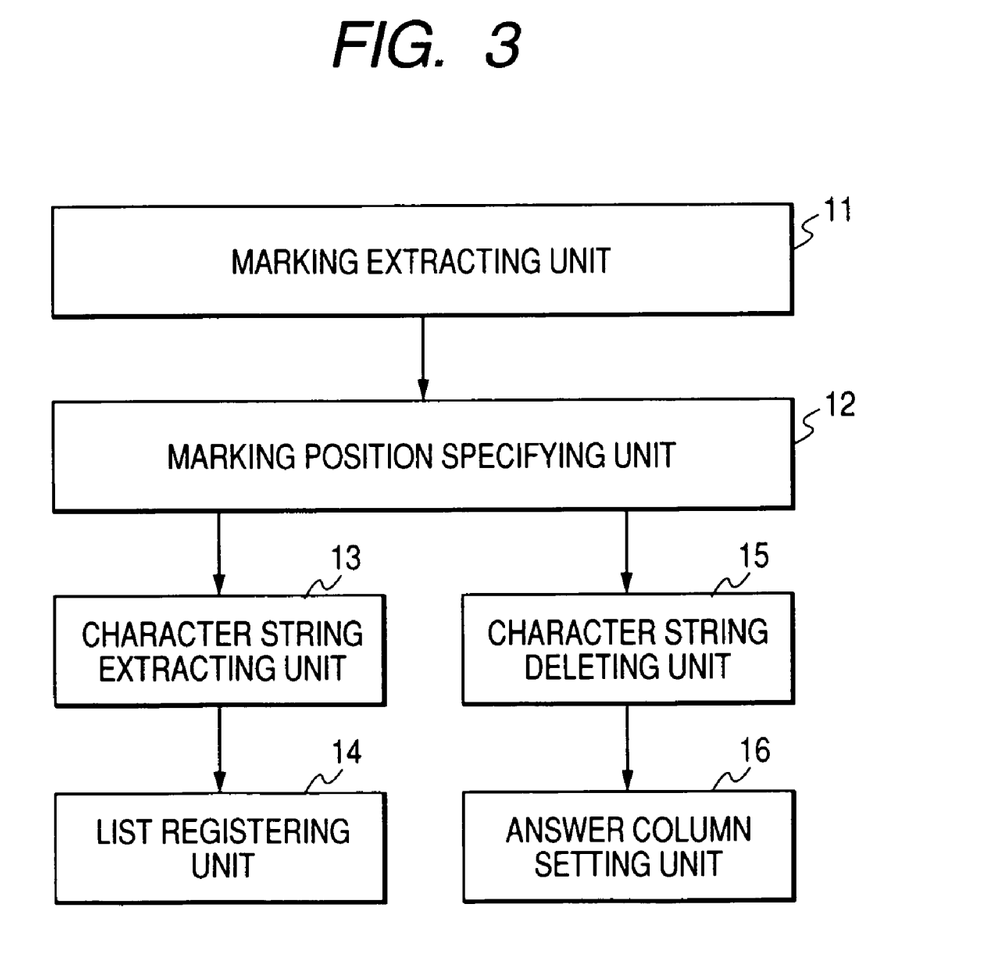
FIG. 3 is a block diagram for representing an internal arrangement of an image processing unit.

The image processing unit 3 is to perform various sorts of image processing operations by employing image data of a question original read by the image reading unit 1. As indicated in FIG. 3, the image processing unit 3 has been provided with a marking extracting unit 11, a marking position specifying unit 12, a character string extracting unit 13, a list registering unit 14, a character string deleting unit 15, and an answer column setting unit 16 as a portion of the image processing function. Among these function units, the marking extracting unit 11, the marking position specifying unit 12, the character string extracting unit 13, and the list registering unit 14 constitute an answer list forming means according to the present invention. Also, the marking extracting unit 11, the marking position specifying unit 12, the character string deleting unit 15, and the answer column setting unit 16 constitute a question sentence forming unit according to the present invention.

The marking extracting unit 11 is to extract an image of marking 8 from the image data of the question original 7 read by the image reading unit 1. The marking position specifying unit 12 specifies a position (namely, image position) of the marking 8 extracted by the marking extracting unit 11.

The character string extracting unit 13 is to extract such a character string which is designated by the marking 8 at the position of the marking 8 specified by the marking position specifying unit 12. The list registering unit 14 is to register such a character string extracted by the character string extracting 13 into a character string of the answer list in the case that a question paper is formed by the question paper forming apparatus. The data of the character string which is registered in the character string list of the answer list by the list registering unit 14 constitutes electronic data of the answer list, and then, this electronic data is transmitted to the printing unit 5 as print purpose data of an answer document. The answer document implies such a document which contains the character string data (electronic data of answer list) registered in the character string list of the answer list by the list registering unit 14. As a mode of an answer document, such a document that character strings indicative of answers are merely listed may be employed. Alternatively, for example, another mode of this answer document may be employed in which a character string of answers have been embedded with a predetermined color (for example, red color) in an answer column of a question sentence. Also, all of answers of a question paper (question sentence) may be printed out as the answer document. In addition thereto, one answer, or a portion of answers may be alternatively printed out as the answer document.

The character string deleting unit 15 is to delete an image of a character string at the position of the marking 8 specified by the marking position specifying unit 12, while this character string is designated by the above-explained marking 8. The answer column setting unit 16 is to set an answer column to such a portion where a character string has been deleted by the character string deleting unit 15. The image data of the question original 7 where the answer column has been set by the answer column setting unit 14 constitutes electronic data of the question sentence, and then, this electronic data is transmitted to the printing unit 5 as print-purpose data of a question paper.

The data managing unit 4 is to manage various sorts of data by employing the database unit 2. Every time a question paper is formed by the question paper forming apparatus, as one of management items of the data managing unit 4, this data managing unit 4 applies such an identification information (specific information) which can exclusively specify the above-explained question paper, and registers the applied identification information into the database unit 2 in correspondence with the electronic data of the question paper. As the identification information, for example, such an information may be employed which is formed by combining an ID number, a name of a question forming person as to a question paper, a forming day and time, an answering person name of a question (name of pupil), and the like with each other. Among these items, it is so assumed that both the ID number and the name of the question forming person as to the question paper are automatically produced inside the question paper forming apparatus. Also, it is assumed that while a question paper is formed, a question forming person previously inputs both the name of the question forming person and the name of the answering person by using the UI unit 6.

The printing unit 5 is to print out image data on a paper by employing such a printing material as ink and toner. The printing unit 5 is arranged by employing a printer engine which prints image data in accordance with an electrophotographing system, while the electrophotographing system is typically known as the Xerography system.

The UI unit 6 constitutes a user interface through which a user who uses the question paper forming apparatus inputs various sorts of information, and various sorts of information are displayed with respect to the user. The UI unit 6 is arranged by an input operation unit having various sorts of buttons, switches, keys, and the like; and a display unit such as a liquid crystal display.

The question paper forming apparatus with employment of the above-described arrangement may be realized by employing an image forming apparatus, for instance, a digital color copying machine, a digital color composite function apparatus, and the like. In addition thereto, the question paper forming apparatus may be realized by combining a scanner apparatus, a PC (personal computer), and a printer apparatus with each other.

Figure 4:
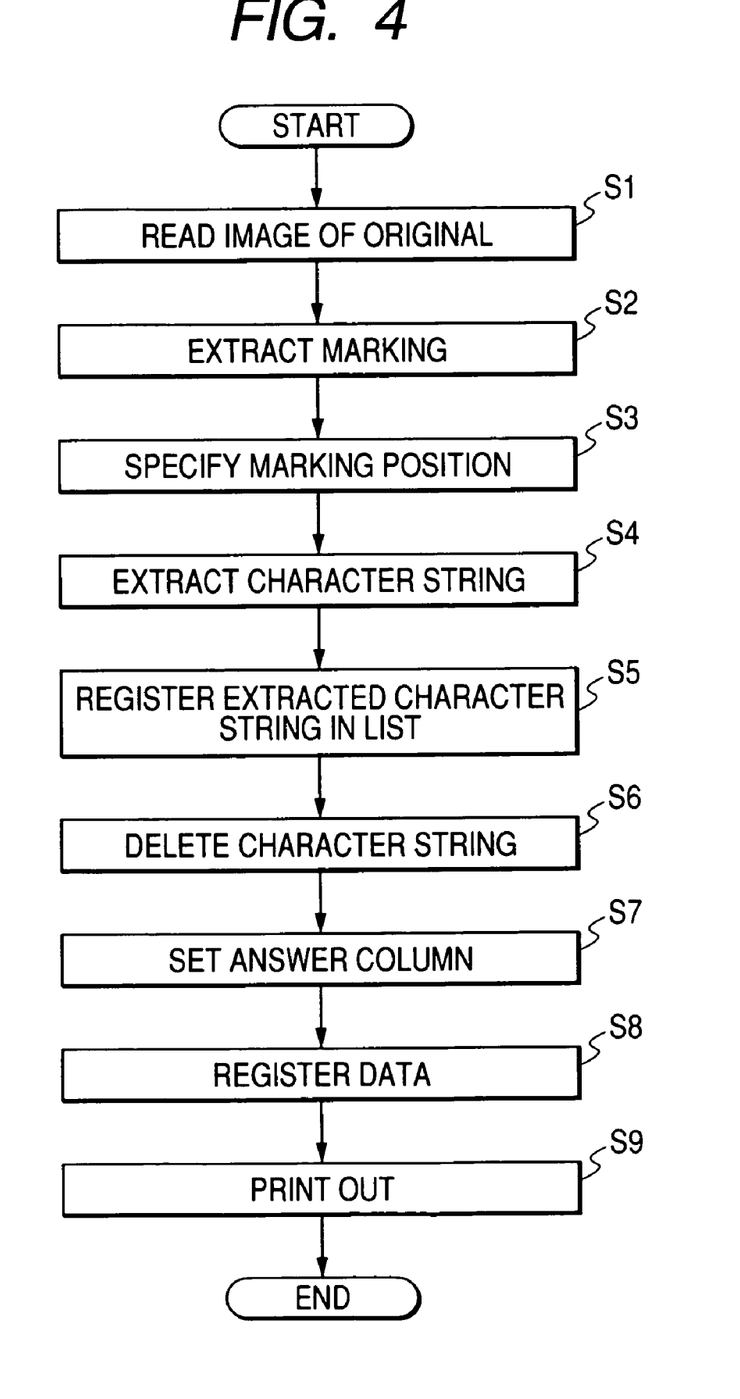
FIG. 4 is a flow chart for describing a question paper forming method according to the embodiment mode of the present invention.

FIG. 4 is a flow chart for describing a concrete sequential operation (question paper forming method) in the case that a question paper is formed by employing the question paper forming apparatus according to the embodiment mode of the present invention. First, the question original 7 provided with the marking 8, which is exemplified in FIG. 2, is set on an original base (not shown in detail) of the image reading unit 1, and a commencement of a process operation is instructed by operating the button and the like of the UI unit 6, so that the image of the question original 7 is read by the image reading unit 1 (step S1).

Next, the image processing unit 3 performs the below-mentioned process operation by employing the image data of the question original 7 read by the image reading unit 1. First, the marking extracting unit 11 extracts an image of marking 8 from the image data of the question original 7 (step S2). The image extraction of the marking 8 is carried out by extracting such an image having a predetermined color which has been previously set from the image data of the question original 7. For example, in the case that the predetermined color has been set to an orange color, an image having an orange color is acquired from the image data of the question original 7 in correspondence with this color setting condition in order to extract the image of the marking 8.

Next, a position of the marking 8 extracted by the marking extracting unit 11 is specified by the marking position specifying unit 12 (step S3). The marking position specifying unit 12 specifies (calculates) the position of the marking 8 in such a manner that with respect to the image data of the question original 7 read by the image reading unit 1, for example, two-dimensional coordinate axes are set while a position of a left upper corner of an image reading area read by the image reading unit 1 is set as an origin, and then, the above-described position of the marking 8 is specified on the coordinate axes based upon coordinate data (x, y). In this case, if marking 8 for designating a character string is written in an underline form, then positions of both edge portions of this underline are specified as the positions of the marking 8. Also, although not shown in the drawings, if marking for designating a character string is painted over, or is written by a rectangular surrounding line, then positions of both edges of a painted-over area, or a surrounded area are specified as the positions of the marking 8, or both a position of an upper right corner and a position of a lower right corner are specified as the positions of the marking 8.

Subsequently, at the position of the marking 8 specified by the marking position specifying unit 12, the character string designated by this marking 8 is extracted by the character string extracting unit 13 (step S4). As previously explained, in such a case that the system for designating the character string by the marking 8 of the underline is employed, the extraction of the character string is carried out by extracting such a character string which is underlined by the marking 8. Also, in such a case that the system for designating the character string by the marking painted over with the fluorescent ink is employed, an extraction of this character string is carried out by extracting such a character string painted over with the marking. Also, in such a case that the system for designating the character string by the marking written by the rectangular surrounding line is employed, an extraction of this character string is carried out by extracting such a character string which is surrounded by the marking. Also, in the character string extracting unit 13, the character strings are sequentially extracted from the upper left corner portion toward the lower right corner within the image data of the question original 7, and further, numbers which are specific to the respective character strings are allocated to these character strings in accordance with extracted sequences thereof, for example, serial numbers are successively allocated to these character strings from a first number. As a result, in such a case of the above-explained question original 7 exemplified in FIG. 2, the number of "1" is allocated to a character string of "Hokkaido" located on the upper side of the question original 7; the number of "2" is allocated to a character string of "mandarin orange"; the number of "3" is allocated to a character string of "Aomori prefecture"; the number of "4" is allocated to a character string of "Hokkaido" located on the lower side of the question original 7; the number of "5" is allocated to a character string of "Kagoshima prefecture"; and the number of "6" is allocated to a character string of "Aichi prefecture", respectively.

The extracting process operation of the character string by the character string extracting unit 13 may be carried out by directly acquiring the image data (scan data) of the character string designated by the marking 8. Preferably, such an extracting process operation is desirable that the image data (scan data) of the question original 7 read by the image reading unit 1 is converted into text data by an OCR (Optical Character Reader) process operation, and then, the character string designated by the marking 8 is extracted from the converted text data. Further, while an error conversion occurred in the case that the OCR process operation is carried out is considered, it is preferable that the image data of the question original 7 is converted into text data by combining the OCR process operation with the natural language process operation. In particular, since these are Kanji characters whose shapes are resembled to each other in a Japanese sentence containing Kanji characters, character strings contained in the image data can be correctly extracted as text data by combining the natural language process operation using a dictionary of Japanese languages.

Figure 5:
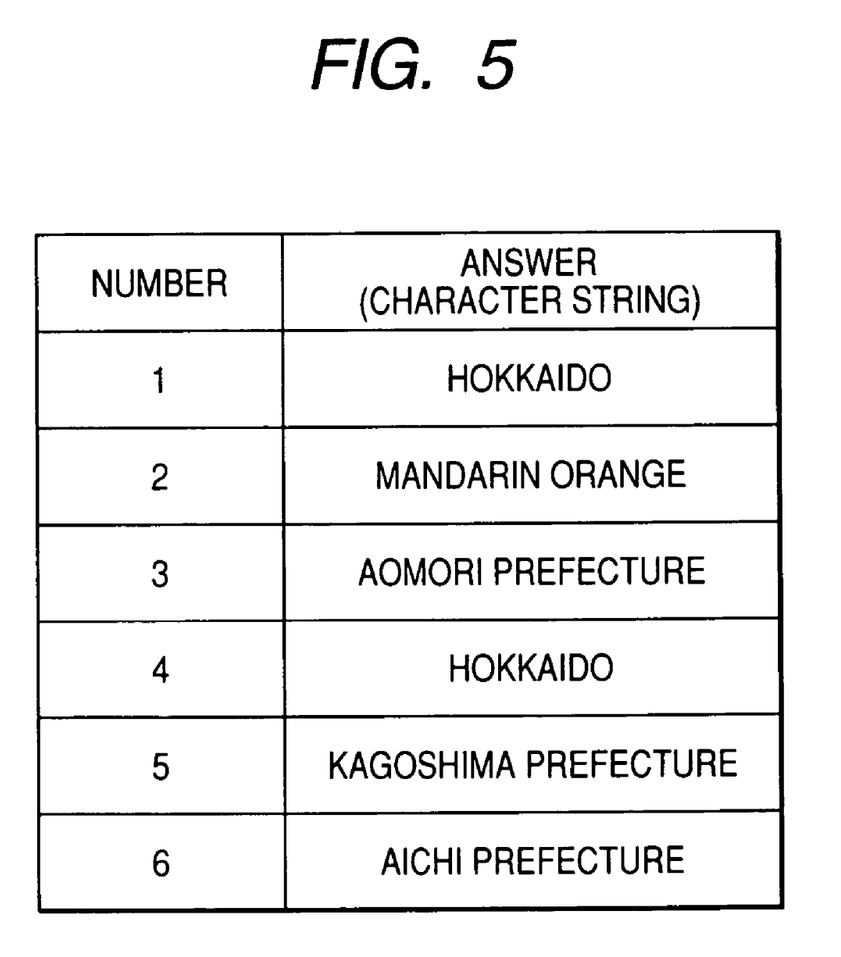
FIG. 5 is a diagram for showing a registration example for an answer list of a character list.

Next, the character string extracted by the character string extracting unit 13 is registered in the character string list of the answer list by the list registering unit 14 (step S5). As a result, electronic data of the answer list is formed. The character string list of the answer list implies that character strings are listed, and these character strings constitute answers of a question paper which will be presently formed. This character string list constitutes original data of the answer list. For instance, as indicated in FIG. 5, character strings (answers) are registered in this character string list in correspondence with answer numbers of questions. As these answer numbers, numbers allocated to the respective character strings in the character string extracting unit 13 are applied.

Subsequently, with respect to the image data of the question original 7 read by the image reading unit 1, at the position of the marking 8 specified by the marking position specifying unit 12, an image of the character string designated by this marking 8 is deleted by the character string deleting unit 15 (step S6). The deleting process operation of the character string by the character string deleting unit 15 may be carried out by converting the image data of the character string designated by the marking 8 into invalid data. Concretely speaking, all of pixel values of the image data of the question original 7 read by the image reading unit 1 are converted into zero values, so that this character string can be deleted.

Next, the answer column setting unit 14 sets an answer column to such a portion that the character string has been deleted by the character string deleting unit 12 with respect to the above-described image data of the question original 7 (step S7). As a result, electronic data of the question sentence is formed. For example, as previously described, setting of the answer column may be carried out in such a manner that an image is attached to the portion where the character string has been deleted, while this image indicates that this portion corresponds to the answer column. In this embodiment mode, as exemplified in FIG. 6, since images made of rectangular frame lines are attached to such portions which should be set to the answer columns, answer columns 9 are provided in the image data of the question original 7. In this case, a dimension of an image made of a frame line may be made substantially equal to a dimension of an image of a character string deleted by the character string deleting unit 12. Also, in the case that images of frame lines are attached, answer numbers are added inside these frames. As to the answer numbers added in this case, as previously explained, the numbers allocated to the respective character strings by the character string extracting unit 13 are applied. It should also be noted that as to answer columns contained in a sentence, these answer columns may be alternatively indicated by images other than the frame line (for example, image written by brackets). With execution of the above-described process operations, the process operations of the image processing unit 3 as to one sheet of the question original 7 are accomplished.

Next, the data managing unit 4 applies (produces) identification information which is specific to the present process operation for forming the question paper, and then, registers (stores) the produced identification information in the database unit 2 in correspondence with the electronic data of the question paper (step S8). The electronic data of the question paper which is registered in the database unit 2 contains both the electronic data of the question sentence to which the answer column has been set by the answer column setting unit 14 and the electronic data of the answer list which has been registered in the list by the list registering unit 14.

Figure 6:
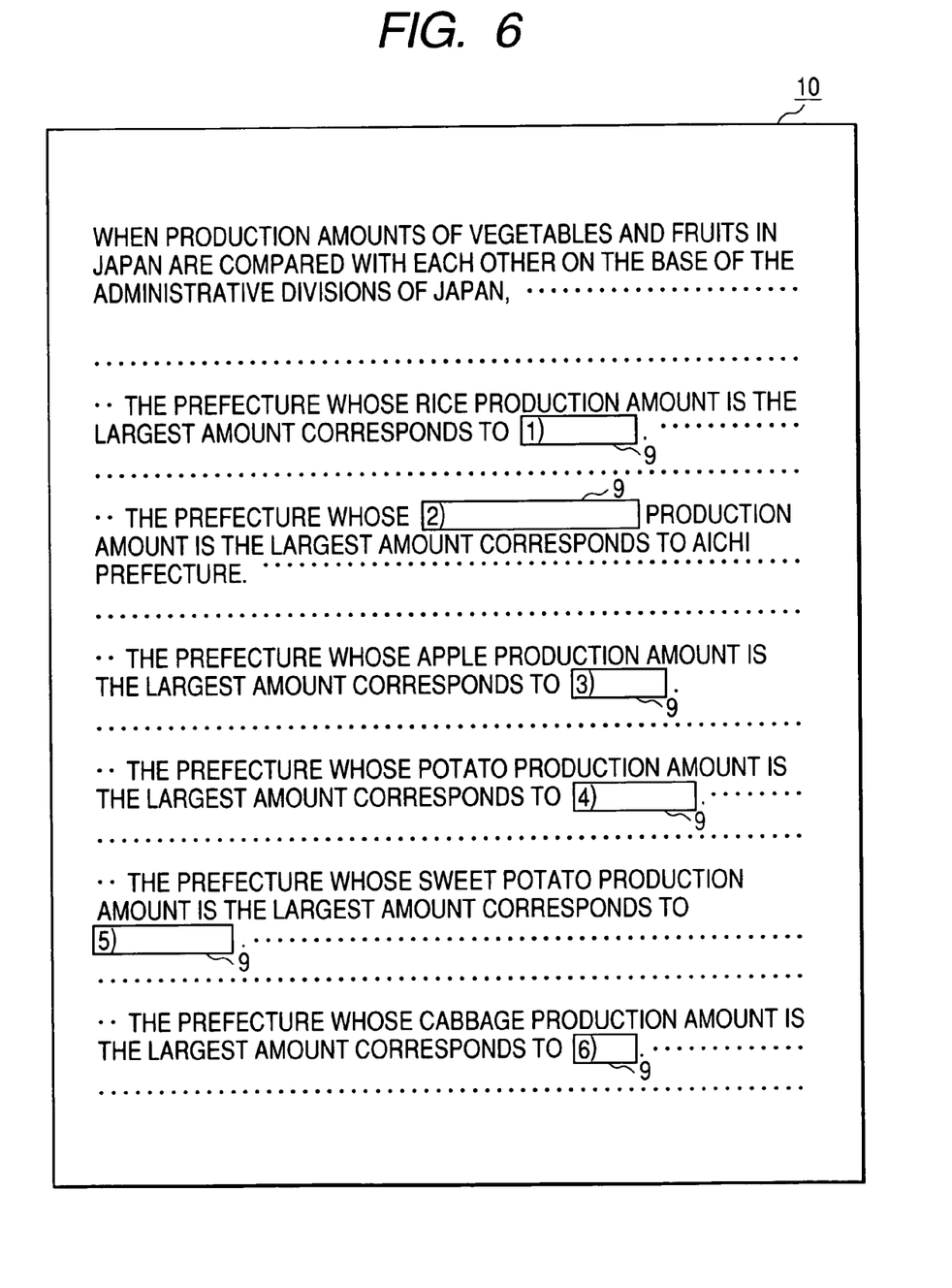
FIG. 6 is a diagram for representing a forming example of a question paper.

Thereafter, while the electronic data registered in the database unit 2 by the data managing unit 4 are employed, namely both the image data of the answer list and the electronic data of the question sentence are employed, these electronic data are printed out on separate papers by the printing unit 5 respectively (step S9). As a result, as indicated in FIG. 5, such an answer document where the character lists for constituting the answers have been grouped in the list form, and as indicated in FIG. 6, such a question paper 10 where the numbers from "1" to "6" have been applied to the answer columns (contents of frames lines) 9 of the sentences for constituting the question sentences are obtained. In this example, the process operation of the step S9 is carried out after the process operation of the step S8 has been performed. Alternatively, this sequence may be reversed.

As previously described, in accordance with the question paper forming apparatus and the question paper forming method related to the embodiment mode of the present invention, the question original 7 in which the marking 8 has been written by the underlines, or the like to the portions of the character strings which are wanted to be used as the answers of the questions is set to the question paper forming apparatus by way of the operation similar to that of a general-purpose copying machine, and the commencement of the reading operation for the image of this question original 7 is instructed, so that both the question paper and the answer document can be acquired at the same time. As a consequence, the question paper can be formed in a simple manner and in a short time without forcibly giving excessive workloads to the question forming person.

Also, since the electronic data (namely, both electronic data of question sentence and electronic data of answer list) as to the formed question paper are registered in the database unit 2, when the user refers to the electronic data of this question paper later, the user can grasp the forming day and time (time period) of the question paper, the name of the question forming person, and the name of the answering person based upon the identification information registered in correspondence with this question paper. Furthermore, when a question paper is printed by the printing unit 5, the identification information defined in correspondence with this question paper may be utilized so as to manage other data in such a manner that this identification information is embedded in the image of the question paper by employing an information embedding technique such as, for example, "Glyph Code®."

Figure 7:
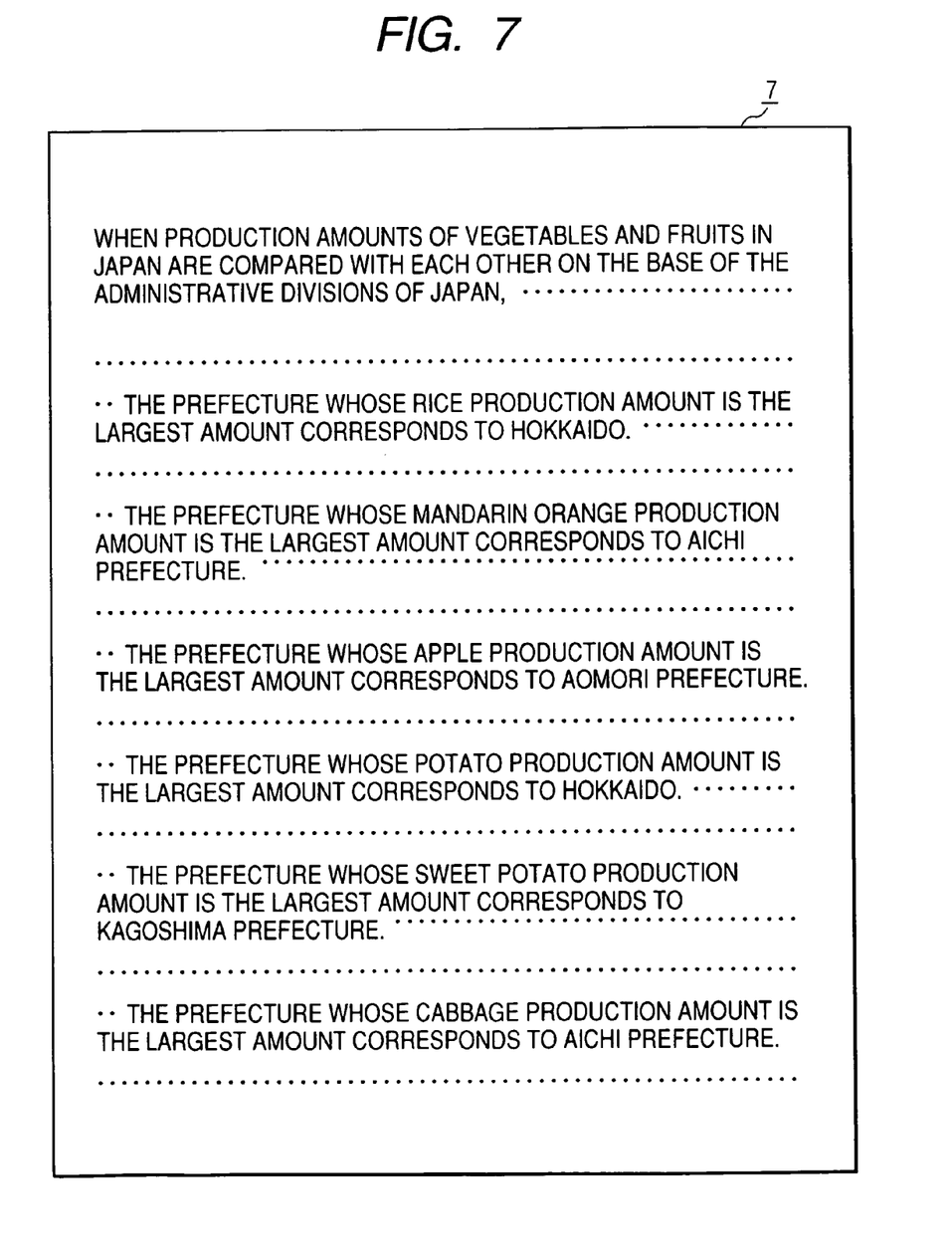
FIG. 7 is a diagram for showing a question original before marking is written.

It should also be noted that while the color of the marking 8 has been preset to the question original 7, when the marking 8 is extracted, since the image having the preset color is acquired, the image of the marking 8 is extracted in the above-described embodiment mode. However, the present invention is not limited only to this embodiment mode. For instance, the image of the marking 8 may be alternatively extracted in accordance with the following manner. That is, as indicated in FIG. 7, while an image of a question original 7 before the marking 8 is written is read by the image reading unit 1, image data of this read image may be registered (stored) in the database unit 2 as original image data; and in an extracting process operation of the marking 8, the image of the marking 8 may be alternatively extracted by making a difference between image data of the question original 7 which has been read with the marking 8 and the original image data (namely, image data of question original 7 which has been read without marking 8) which has been previously registered in the database unit 2. Also, in the above-described embodiment mode, the character strings which constitute the answers are grouped in the list form, and the grouped character strings are printed out as the answer document. Alternatively, the grouped character strings may be synthesized with the electronic data of the question paper, and the answers corresponding thereto may be synthesized with the answer column portion in, for example, a red color, and then, the resultant data may be outputted. Also, the present invention is not limited only to such an example that all of the answers contained in the question paper are outputted as the answer list, but may be realized in such a manner that either one or a portion of these answers are printed out as the answer document. Similarly, the present invention is not limited only to such a case that all of the read question originals are printed out as the question paper, but may be realized by that only a portion of these read question originals is printed out.

Also, in the question paper forming method (flow chart of FIG. 4) according to the above-explained embodiment mode, as to the plurality of marking 8 written in the question original 7, the extracting process operation for the marking 8 (step S2), the specifying process operation for the marking position (step S3), the extracting process operation for the character string (step S4), the registering process operation to the character string list (step S5), the deleting process operation of the character string (step S6), and the setting process operation of the answer column (step S7) are grouped as a single step which is executed. Alternatively, in addition to the above-explained process operation, each of the above-explained process operations (namely, process operations defined from step S2 to S7) may be repeatedly carried out with respect to each of the plural marking 8.

The entire disclosure of Japanese Patent Application No. 2005-184527 filed on Jun. 24, 2005 including specification, claims, drawings and abstract is incorporated herein by reference in its entirety.

What is claimed is:

1. A question paper forming apparatus, comprising:
    an image reading unit that reads an image of a question paper, the question paper including text in which a character string for constituting an answer of a question is designated by a mark;
    an answer list forming unit that extracts the character string designated by the mark from the question paper and that forms an electronic data of an answer list by the use of the extracted character string;
    a question sentence forming unit that deletes the character string designated by the mark from the question paper and that sets an answer column to a portion where the character string is deleted, so as to form an electronic data of a question sentence; and
    a printing unit that prints out an answer document which contains the electronic data of the answer list and the electronic data of the question sentence as the question paper on separate papers respectively.

2. The question paper forming apparatus as claimed in claim 1, further comprising:
    a registering unit that registers into a database the electronic data of the answer list formed by the answer list forming unit and the electronic data of the question sentence formed by the question sentence forming unit.

3. A question paper forming method, comprising:
    reading an image of a question paper, the question paper including text in which a character string for constituting an answer of a question is designated by a mark;
    extracting the character string designated by the mark from the question paper;
    forming electronic data of an answer list by the use of the extracted character string;
    deleting the character string designated by the mark from the question paper;
    setting an answer column to a portion where the character string is deleted to form electronic data of a question sentence; and
    printing out an answer document which contains the electronic data of the answer list and the electronic data of the question sentence as the question paper on separate papers respectively.

4. A question paper forming method as claimed in claim 3, further comprising: registering into a database the electronic data of the answer list and the electronic data of the question sentence.

* * * * *